United States Patent [19]
Feller

[11] Patent Number: 6,023,969
[45] Date of Patent: Feb. 15, 2000

[54] FLOW MODULATED MASS FLOW SENSOR

[76] Inventor: Murray F. Feller, Rt. 2, Box 562A, Micanopy, Fla. 32667

[21] Appl. No.: 09/006,246

[22] Filed: Jan. 13, 1998

Related U.S. Application Data

[63] Continuation-in-part of application No. 08/932,646, Sep. 17, 1997, abandoned.

[51] Int. Cl.$^7$ ...................................................... G01F 1/68
[52] U.S. Cl. ........................ 73/204.25; 73/202.5; 374/132
[58] Field of Search ................................... 73/202, 202.5, 73/203, 204.19, 204.25; 374/132, 134, 135

[56] References Cited

U.S. PATENT DOCUMENTS

| | | |
|---|---|---|
| 3,777,561 | 12/1973 | Lewis . |
| 3,802,262 | 4/1974 | Banks . |
| 3,830,104 | 8/1974 | Gau ...................................... 73/861.19 |
| 3,897,684 | 8/1975 | Dewan . |
| 3,903,741 | 9/1975 | Greene . |
| 3,967,500 | 7/1976 | Forster . |
| 4,195,515 | 4/1980 | Smoll . |
| 4,550,614 | 11/1985 | Herzl ..................................... 73/861.19 |
| 4,825,703 | 5/1989 | Kubota . |
| 5,574,228 | 11/1996 | Bazin ..................................... 73/861.19 |
| 5,708,214 | 1/1998 | Kiguchi ...................................... 73/202 |

FOREIGN PATENT DOCUMENTS

| | | |
|---|---|---|
| 0 069 456 | 1/1983 | European Pat. Off. . |
| 1 231 447 | 12/1966 | Germany . |
| 1 648 143 | 3/1971 | Germany . |
| 30 00 965 A1 | 7/1981 | Germany . |
| 33 29 899 A1 | 3/1985 | Germany . |
| 37 00 165 A1 | 7/1988 | Germany . |
| 2-280012 | 2/1991 | Japan . |

*Primary Examiner*—Harshad Patel
*Attorney, Agent, or Firm*—Harness, Dickey & Pierce, P.L.C.

[57] ABSTRACT

A sensor for measuring the flow rate of a fluid through a conduit. The fluid flow rate in the vicinity of a heated temperature sensor is made to cyclically vary from a minimum to a maximum to produce a cyclic signal indicative of the heat removed from the sensor by the fluid flow. The magnitude of the cyclic signal is representative of the mass flow rate of the fluid. A detection circuit responsive to the cyclic signal extrapolates therefrom the mass flow rate and provides an output signal related thereto. Mechanically and electrically balanced configurations enable high speed and high precision measurements to be obtained. Bypass and sampling embodiments are presented. In alternative preferred embodiments circuits are disclosed for determining and maintaining a constant average temperature difference between the sensors and the fluid being sensed, to thereby replace heat loss by the sensors as a result of contact with the fluid being sensed.

19 Claims, 7 Drawing Sheets

FLOW MODULATED MASS FLOW SENSOR

CROSS REFERENCE TO RELATED APPLICATIONS

This application is a continuation-in-part of U.S. Ser. No. 08/932,646 filed Sep. 17, 1997, now abandoned.

BACKGROUND OF THE INVENTION

TECHNICAL FIELD

The present invention relates generally to flow meters covering a wide range of flow rates and, in particular, to a flow sensor having one or more heated, electrically-responsive, temperature-sensitive sensors responsive to a modulated component of a flow stream, whereby the magnitude of the sensor's signal is an indication of flow rate.

DISCUSSION

There are many different flow detecting methods employed in commerce, industry, medicine and agriculture, for example, each having a unique balance of measurement characteristics. One method currently available utilizes a heated temperature sensing element, such as a thermistor, which is heated by an electric current and cooled by the fluid flow. A measure of the thermistor's change in resistance is related to flow rate. This type of flow sensor is very limited in practical application, however, because it is unstable. With present day forms of such flow sensors signal offsets are easily produced by changes in the fluid temperature and component drifts, and the buildup of scale such as film or debris on the surface of the sensor, which act as a thermo-insulator to the fluid. However, if a second thermistor similar to the first one is added to detect the fluid temperature and thereby provide a means, for example, in a bridge circuit, for drift compensation due to fluid temperature changes, the overall drift will be substantially reduced. Even with such compensation there still remain drifts and uncertainties which limit the application of such sensors.

The present invention substantially reduces the drift factors inherent in prior art devices, thereby enabling this form of flow rate sensing to be used over a wider range of flow rates, and where faster response or greater precision of measurement is required. Of particular note is that the prior art commercial flow meters typically have their measurement drifts and accuracies specified as a percentage of span, whereas the same characteristics of a flow sensor based on the present invention can be specified as a percentage of rate.

SUMMARY OF THE INVENTION

The above and other objects are provided by a flow sensor in accordance with preferred embodiments of the present invention. In one preferred embodiment the present invention employs certain flow detection principles disclosed in U.S. Pat. No. 5,390,541, the disclosure of which is hereby incorporated by reference.

In one preferred embodiment, the fluid flow past a heated, electrically-responsive, temperature-sensing sensor is made to vary in velocity from a minimum to a maximum by means of a motor-driven valve referred herein to as a "modulator". A detection circuit in the form of an electrical high pass filter is employed to enable only the variation in sensor signal caused by the modulator to be used as an indication of flow rate. Consequently, drifts at zero flow rate due to long term component instabilities are virtually eliminated. Furthermore, a modulation rate much higher than the thermal time constant of the temperature sensors may be effectively employed to accurately measure rapidly changing flow rates.

The present invention further embodies a second fluid flow modulated, heated, electrically responsive temperature-sensing sensor. The sensor is mechanically oriented with the first sensor so that when the fluid flow is at a maximum through the first sensor it is at a minimum through the second sensor, and visa versa. This alternating fluid flow pattern enables the common mode signals of both temperature sensors to be cancelled and is also particularly effective in reducing the recovery time to reestablish thermal equilibrium of the temperature sensors in response to abrupt changes in fluid flow rate. As a result, little or no flow signal overshoot or overdamping occurs.

Prior art flow meters, in comparison, typically exhibit substantial drift, particularly at zero flow rate. As a result, the measurement error at low flow rates can be very high and such meters are typically specified for measurement precision as a percentage of span. By contrast, the flow sensor of the present invention has a very stable output at zero flow rate because the electrical signal components corresponding to slow drifts have been removed from the meter's output signal. Such a separation is made possible by extracting only the modulation signal from the combined direct current and modulation signal provided by the temperature sensors. As a result, the flow sensor of the present invention is typically specified for measurement precision as a percentage of rate, since zero fluid flow rate corresponds to a known and stable calibration point.

The present invention further is also well suited to fluid flow bypass and sampling arrangements for enabling use in large pipes and at high fluid flow velocities. Of particular note is that the excellent zero stability and low flow performance achieved with the present invention enables, for example, a bypass flow sensor to be produced which only requires a very low pressure drop. As a result, only a very small flow obstruction in the path of the fluid is required to provide the differential pressure, and therefore a sufficient bypass fluid flow, needed for practical operation.

In alternative preferred embodiment, modifications to the flow modulator are disclosed. A circuit for monitoring and replacing the heat loss by the heated, electrically responsive temperature-sensing sensors is also disclosed.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figures 1A, 1C:
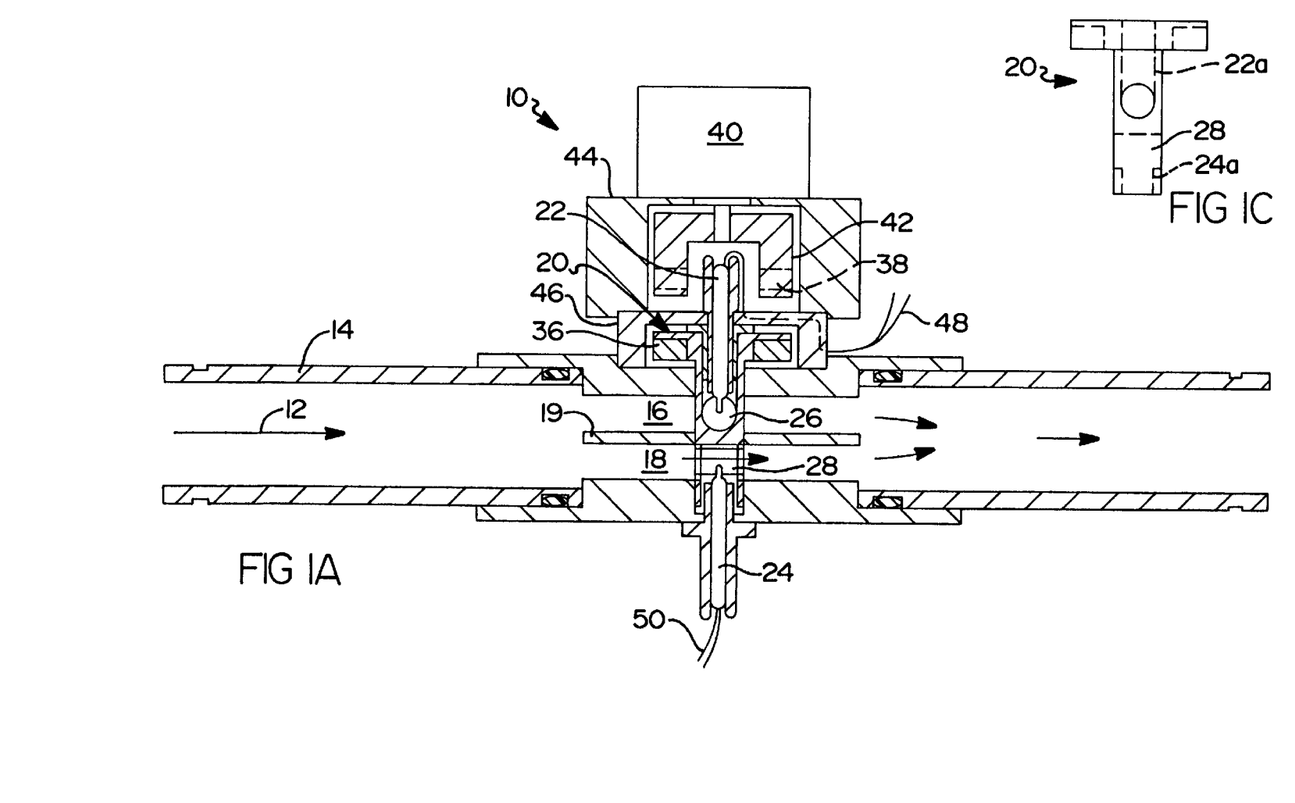
FIG. 1A is a longitudinal cross-sectional view of an in-line flow sensor arranged in accordance with a preferred embodiment of the present invention.
FIG. 1C illustrates a side view of the flow sensor of FIG. 1B in accordance with directional line 1C—1C in FIG. 1B.
Figure 1B:
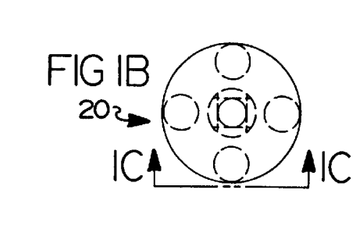
FIG. 1B illustrates a plan view of a flow modulator of the flow sensor.

Referring to FIG. 1A, a flow sensor 10 in accordance with a preferred embodiment of the present invention is shown. Fluid flow 12 enters a conduit forming a flow passage 14 from the left and can then enter either of one of two smaller passages 16 and 18. The smaller passages 16 and 18 are produced by a member 19 fixedly positioned within the flow passage 14. A rotating flow modulator 20 alternately opens one passage 16 or 18 at a time so that each one of a pair of heated, electrically responsive, temperature-sensitive sensors 22 and 24 alternately are impinged by the fluid flow 12. The temperature sensors 22 and 24, which are heated by an electric current, are cyclically cooled by the fluid flow 12 and produce a corresponding alternating electrical signal with a magnitude responsive to mass flow rate.

Small glass-enclosed, negative temperature coefficient, resistance bead thermistors which are well known in the industry, are particularly well adapted for use as the temperature sensors 22, 24. In a preferred mode of operation a constant current is passed through the bead of each sensor 22, 24 to cause it to heat sufficiently and to raise its temperature so that its temperature is regeneratively increased as its resistance is reduced, to where the constant current provides a limit to the regeneration and stabilizes operation.

Figure 3:
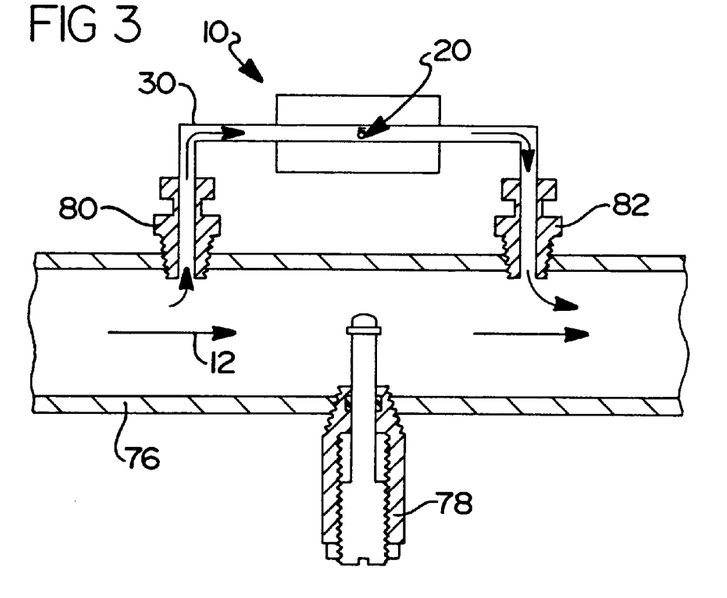
FIG. 3 illustrates a bypass application of the sensor of FIG. 1.

The sensors 22 and 24 are partially inserted into passageways 22a and 24a in the flow modulator 20. The active tips (i.e., beads) of the temperature sensors 22 and 24 are exposed to flow passage openings 26 and 28, respectively, in the flow modulator 20, which are illustrated more clearly in the view of FIG. 1C. These openings 26 and 28 are displaced by 90 degrees so that only one of the openings 26, 28 is positioned parallel to the flow direction (i.e., fully opened) when the other is fully closed. As the modulator 20 rotates it gradually opens one opening 26 or 28 and closes the other so that the flow through the entire flow sensor 10 is not seriously disrupted and the modulator 20 does not experience the full pressure of the fluid flow being measured. A variation of this principle is illustrated in FIG. 3, in which a measure of the flow rate is made in a relatively small bypass tube 30 responsive to the flow in a much larger main tube 32. In another alternative configuration shown in FIG. 4, the modulator 20 interacts with only a small portion of the cross section of the flow passage 14 and controls only a sample of the flow in the vicinity of the temperature sensors 26 and 28.

Since the modulator 20 is not required to completely control the flow on or off or to withstand the loading of seals or significant pressure drops, it is able to rotate easily. Magnetic coupling, as between magnets 36 and 38, may be used to transmit the rotational forces generated by a motor 40 to the modulator 20. The drive magnets 38 are supported by a magnet mount 42 which is connected to the motor 40. Mechanical housing components 44 and 46 support the various parts and with the temperature sensors 22 and 24 and their seals, provide a barrier between the motor 40 and the flowing fluid 12. Electrical leads 48 and 50, from the temperature sensors 22 and 24, respectively, are connected to the supporting electronics (not shown).

Figure 2:
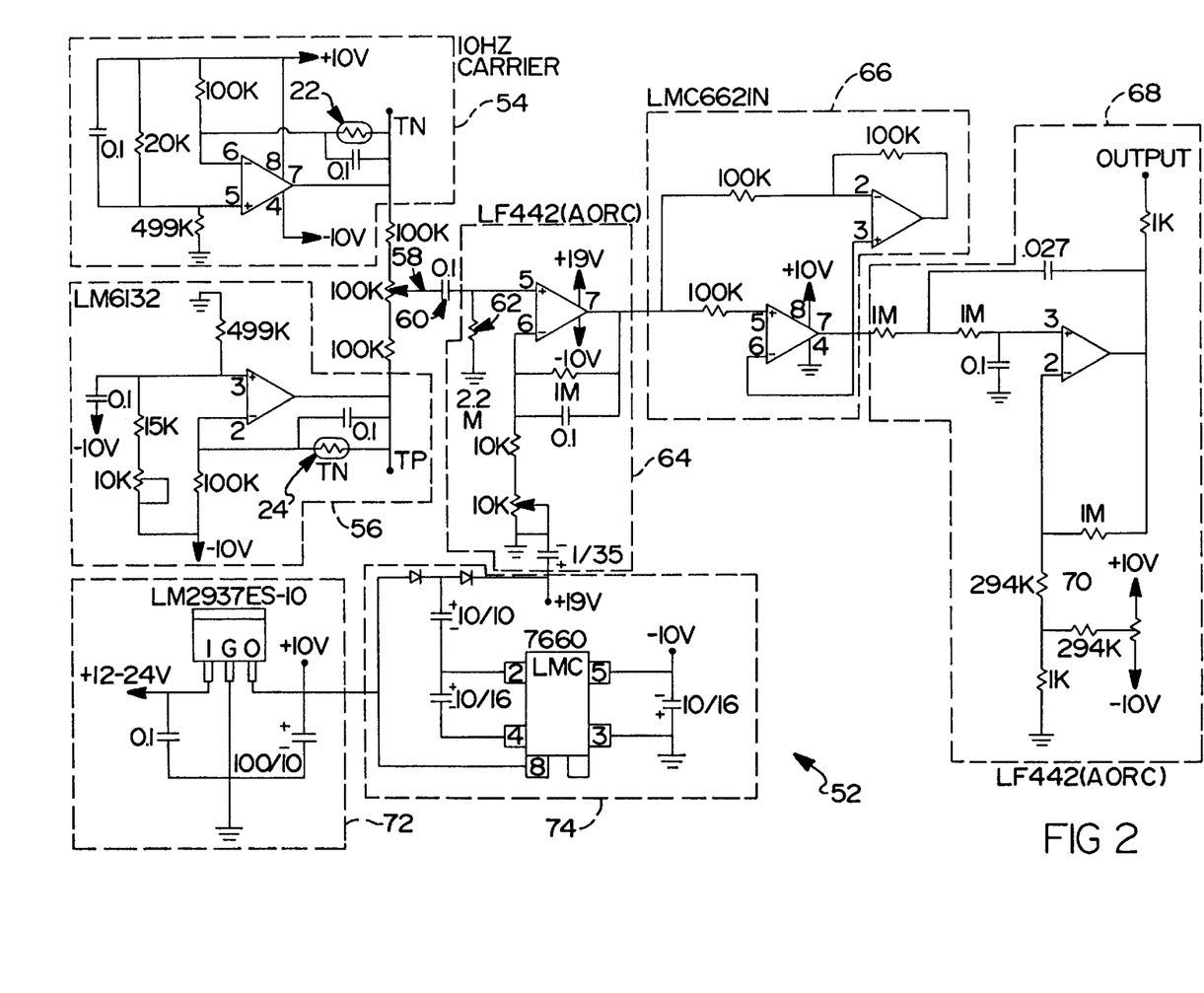
FIG. 2 is an electrical schematic diagram of a circuit for use with the sensor of FIG. 1.

FIG. 2 illustrates a suitable electronic detection circuit 52 for the flow sensor 10 of FIG. 1. Each sensor 22 and 24 is supplied current from its own constant current source 54 and 56, respectively. The upper sensor 22 is referenced to a positive supply (+10V) while the lower sensor 24 is referenced to a negative supply (−10V). The outputs from both sensors 22, 24 are phase opposed and matched with an AC balance adjustment 58. This ensures that during abrupt changes in fluid conditions, and as the sensors and their respective circuits reestablish their new operating points, their offsets are balanced, cancel each other and do not cause major transients and subsequent long periods of recovery. Common mode signals produced, for example, by a momentary variation in the modulator 20 rotational rate, are similarly balanced and opposite in polarity and therefore cancel each other, thereby having a negligible effect on the overall flow measurement precision. A single temperature sensor and constant current source can, of course, be used for a less expensive instrument. It is also noted that while the modulator 20 rotation may cause a slight fluid flow to exist in the vicinity of the sensors 22, 24, this flow is constant, thereby producing a constant offset signal which is easily eliminated with a zero offset adjustment. Any DC or slowly changing signal component characteristic of sensor drift is eliminated by a DC blocking capacitor 60 and shunt resistor 62.

The remainder of the circuit 52 incorporates an AC coupled signal amplifier with span adjustment 64, a full wave rectifier 66, an output amplifier 68 with low pass filtering and zero adjustment 70, a power regulator 72 and a converter 74. Additional signal filtering and other known techniques may be used to adjust the sensor's 10 performance as required.

The AC signal coupling components 60 and 62 remove the DC and slowly changing components of the signals, and therefore the slow drifts usually associated with mass flow sensors. In particular, very little drift at the low and zero flow rates is experienced. This enables a single flow sensor of this type to cover a much larger flow range, possibly replacing two conventional mass flow sensors. A minimum to maximum flow rate range of 100:1, and possibly much larger, is feasible in a commercial product. The sensor 10 is also able to measure extremely low flow rates. It also becomes feasible to specify the sensor's 10 measurement characteristics as a function of the rate being measured rather than as a percentage of span, the typical practice with conventional mass flow sensors. This is because precision calibration can be performed at or near the two end points of the operating range.

The thermal time constant of the temperature sensors 22 and 24 play an important role in determining the speed of response of the flow sensor 10 to changes in the fluid flow rate 12. The rotational rate of the modulator 20 can also affect this speed of response. If the rotational rate is relatively low so that the temperature sensors 22 and 24 have enough time to fully adjust to their alternating exposure and shielding from the flow stream 12, the highest flow detecting sensitivity will be achieved but at the lowest speed, that being essentially determined by the thermal time constant of the temperature sensors 24 and 24. If the modulator's 20 rotational rate is substantially increased there will be a loss of sensitivity. However, the inherent ability of the flow sensor 10 to respond quickly will be increased by about the same factor as this loss in sensitivity. The ability of the flow sensor 10 to trade speed of response for flow detection sensitivity is a useful tool in meeting the challenges of varied and difficult flow metering requirements. The sensor 10 provides the unique combination of a sensor having very high sensitivity and calibration stability, which it enables to be effectively used to meet a wide range of flow metering requirements.

Referring further to FIG. 3, the flow sensor 10 is shown configured in a bypass arrangement. A main flow tube 76 is used through which most of the fluid flow 12 passes. A flow inhibitor 78, obstructs the passage of the fluid flow 12 to produce a pressure drop between two sensor pipe fittings 80 and 82 so that a representative fluid flow occurs through the bypass conduit 30, and therefore through the flow sensor 10, which is configured like that of FIG. 1. This arrangement is particularly useful when the rate of the fluid flow 12 is high because the temperature sensors 22 and 24 in the flow sensor 10 are protected from mechanical damage which could occur from contact with solid particles in the fluid flow stream 12.

The high sensitivity of the mass flow sensor 10 of FIG. 3 enables it to respond to very low flow rates and yet consume relatively little power when doing so. The flow inhibitor 78 needs only to obstruct the flow passage 14 slightly to produce a fluid flow through the bypass tube 30, and thus a usable flow for measurement purposes, and as a result the flow inhibitor 78 can be relatively small. In practice, the flow inhibitor 78 could even be a fitting, for example, which contains an adjustment for varying the depth of penetration into the flow path of a part of the fitting for calibration purposes.

The bypass configured mass flow sensor 10 of FIG. 3 may also incorporate valves associated with the fittings 80 and 82, for example, to enable flow through the fittings 80 and 82 to be shut off while the mass flow sensor 10 is removed and/or replaced. This enables sensor maintenance to be performed without disrupting service. Various other configurations which provide a differential pressure and a corresponding flow representative of mass flow rate can readily use the mass flow sensor 10 as the flow sensing means.

Figure 4:
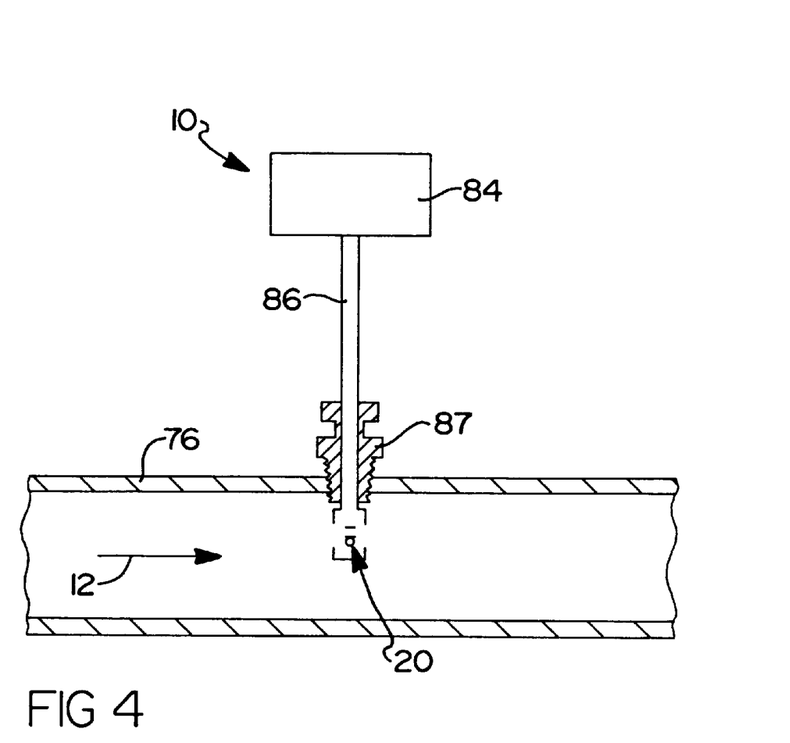
FIG. 4 illustrates an insertion probe application of the flow sensor of FIG. 1.

FIG. 4 illustrates an insertion probe configuration of the mass flow sensor 10 of FIG. 3, whereby the fluid flow 12, as contained by main flow tube 76, passes through the mass flow sensor 10. The motor 40 and the supporting electronics may be located in an enclosure 84 at the end of a stem support or conduit 86. A mechanical connection such as a long thin shaft would typically connect the motor 40 to the magnet mount 42 (FIG. 1A). More than one mass flow sensor 10 operating from the same motor 40 or separate probe sensors may be used to obtain an even more accurate sampling of the fluid flow 12.

As will be appreciated, the fluid flow modulator 20 described herein requires mechanical effort to operate. This effort usually becomes substantially greater when the fluid flow rate is high because the force of the fluid increases the bearing loading between the moving and stationary parts of the sensor 10. A way of reducing this effort is by the direct use of the fluid flow to help perform the modulation function. Small fins, for example, attached to the outside of the flow modulator 20 in the manner of a paddle wheel flow sensor and angled to produce a torque in one direction, can be so used.

Figures 5, 5A:
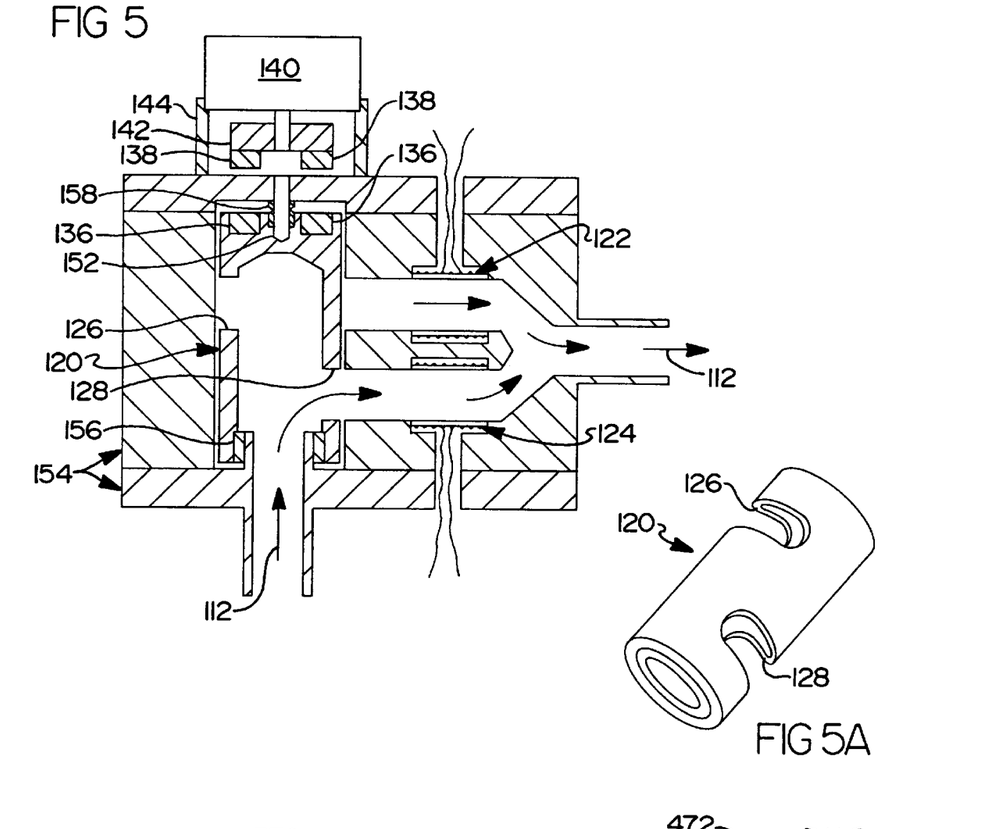
FIG. 5 illustrates an alternative preferred embodiment of the mass flow sensor of the present invention.
FIG. 5A is a perspective view of the flow modulator shown in FIG. 5.

In an alternative preferred embodiment the modulation means could be mechanically configured whereby the force of the flowing fluid is supported primarily by a relatively small thrust bearing exhibiting a small rotational loading. A flow sensor incorporating such an arrangement is illustrated in FIG. 5 and consists of a housing 154 containing a flow modulator 120 and cylindrical, heated, temperature responsive sensing elements 122 and 124, and a motor 140. The flow modulator 120 is also illustrated in FIG. 5A. The flow modulator 120 is tubular with one closed end and two opposed exit ports 126 and 128, which line up with the flow passages leading to the sensors 122 and 124. A thrust bearing 158 supports the axial load of the flow modulator 120 produced by the fluid flow 112 and the magnetic coupling between magnets 136 and 138. Shaft 152, in conjunction with bearing 158, radially centers the upper end of flow modulator 120 while bearing 156 provides similar centering for its lower end.

FIG. 5 shows the fluid flow 112 entering the flow modulator 120 from the bottom and exiting from its lower opening 128 through the heated temperature responsive sensor 124 before leaving the housing 154. The motor 140 rotates a disc 142 having magnets 138 which are attracted to magnets 136 on the flow modular 120. This enables the motor 140 to rotate the flow modulator 120, thereby alternating the flow through ports 126 and 128 and their respective elements 122 and 124. One cycle of motor rotation thus produces one cycle of each port 126, 128 opening.

The motor 140 loading may be reduced further by adding additional openings to the modulator 120 so that the fluid flow 112 through it is axially balanced. This may be achieved for example, by adding two additional openings, one opposite opening 126 and the other opposite opening 128, and corresponding parallel flow passages in housing 154. In this manner, two cycles of flow modulation through each heated temperature responsive sensor will occur for each cycle of the motor 140.

It will also be appreciated that a heated temperature responsive flow sensing element could be made from a coil of temperature responsive wire, such as copper wire, which is wrapped around a thin cylindrical tube through which the fluid flow passes. A modification of this structure is a self suspended coil of similar wire in a cylindrical shape. Such an element, by eliminating the tube, has a smaller thermal mass and more intimate thermal contact with the fluid being sensed, and therefore provides faster and more sensitive response.

In a preferred embodiment of the present invention a self-suspended coil is made from small diameter electrically insulated nickel which is close spaced and lightly impregnated with epoxy. More than one coil layer may be used providing that good thermal coupling exists between the layers so that they are suitably responsive to the effects of the fluid flow. When two or more layers are used, the layers can be slightly angled with respect to each other, thereby providing substantial mechanical strength. One method for making such a coil is to wind and epoxy impregnate it on a plastic form, after which the form only is removed with a solvent.

FIG. 2 illustrates a schematic diagram of a useful electronic circuit for measuring flow rate with the present invention. As long as the temperature of the heated temperature-sensitive sensors 22 and 24 is maintained well above, and ideally a fixed amount above, that of the fluid being sensed, and the temperature change of these elements is small compared to the temperature difference between the fluid and the elements, the flow sensor 10 responds to the mass flow rate of the fluid. However, some small degree of mass flow rate error may be present over a wide range of operating conditions which may not be tolerable for some applications requiring extreme accuracy in the mass flow rate measurement. These errors may be compensated for by using signal amplification means with amplification control responsive to fluid flow rate and also to the temperature difference between the fluid and the average temperature of the heated temperature responsive sensors. However, since these means are subject to relatively high measurement error due, for example, to the need for aggressive nonlinearization of the bridge output signal amplifiers to compensate for signal compression at high flow rates, they are of limited value.

Regardless of the form of the temperature-responsive heated temperature sensing element, whether it be, for example, a bead negative temperature coefficient thermistor or a coil of wire with a positive temperature coefficient, when it is precisely operated at a constant temperature above that of the flowing fluid the cooling effect, and therefore the sensing element signal, is directly related to the mass flow rate of the fluid. Accordingly, monitoring the temperature of each sensing element to maintain the temperature of each sensing element a constant amount above that of the fluid when the maximum flow rate during the flow modulation cycle is present enables a precise mass flow rate measurement to be obtained.

Figure 6:
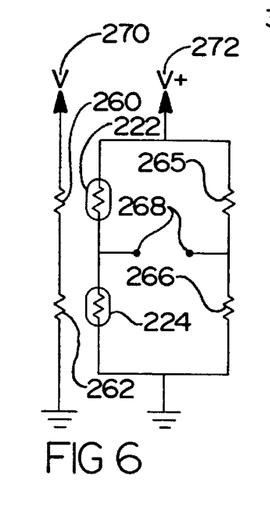
FIG. 6 is an electrical schematic diagram of a bridge circuit and a plurality of heating elements for heating the sensing elements.
Figures 7, 8:
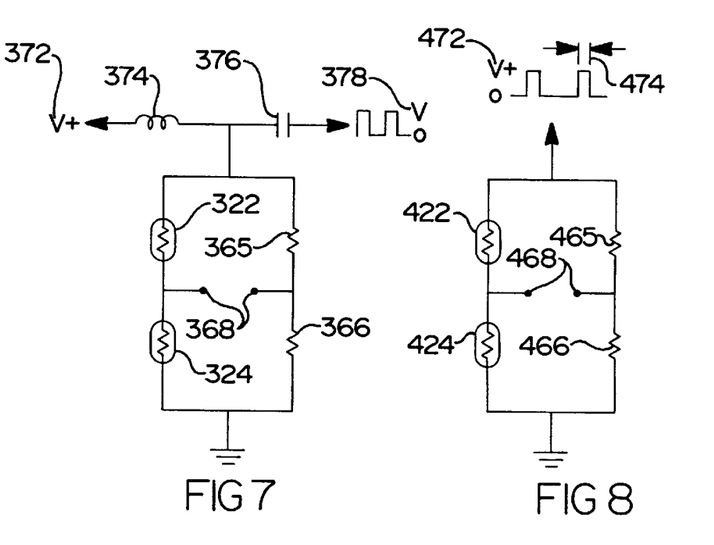
FIG. 7 is an alternative embodiment of a circuit for replacing heat lost by the sensing elements.
FIG. 8 is yet another alternative embodiment of the bridge circuit of FIG. 6.

In FIGS. 6, 7 and 8, means for maintaining a constant temperature difference between the heated temperature responsive sensing elements and the fluid are illustrated. FIG. 6 illustrates a bridge circuit including heaters 260 and 262 to replace the heat removed by the fluid flow. The two heated temperature responsive sensing elements 222 and 224 are two arms of the bridge while two stable resistors 265 and 266 are the other two arms. Their common connection points 268 are the output terminals which provide an alternating output with a magnitude related to the cyclic and alternating temperature changes experienced by the elements 222 and 224. A constant voltage 272 is typically applied across the bridge from V+ to ground. Alternatively, a constant current may be used. Heaters 260 and 262 are electrically powered with a connection at point 270 and directly heat the elements 222 and 224.

The control of power applied to the heaters 260 and 262 may take several forms. One form could be to adjust the power level slowly, compared to the fluid flow modulation rate, so that it tracks the magnitude of the bridge's alternating output at terminals 268 and replaces at least a part of the heat loss due to the fluid flow. Non-linear signal amplifiers may be required for full linearization and stable operation. In another form of power control the temperatures of the sensing elements 222 and 224 are measured and compared against the temperature of the fluid being measured. The difference signal therebetween is used to regulate the power to the heaters 260 and 262 slowly, compared to the fluid flow modulation rate, so that the heat loss to the fluid is accurately replaced.

With the above-described means, separate temperature sensors may be used to measure the temperature of the sensing elements 222 and 224. Alternatively, the bridge circuit comprised of elements 222 and 224 and resistors 264 and 266, with these resistors having relatively high resistance, could form the temperature responsive arm of an additional bridge circuit to measure the temperature of sensing element 222 and sensing element 224. A separate temperature sensor would then typically be used to measure fluid temperature so that a constant average temperature difference of the fluid and the sensing elements 222 and 224 can be maintained over a wide range of flow rates.

The use of separate heaters 260 and 262 to replace the heat removed by the fluid flow enables their power control circuit to maintain the average temperature of the elements 222 and 224 a constant amount above that of the fluid temperature with little interaction between it and the flow sensing circuits. However, the use of additional heaters 260 and 262 has the disadvantages of increased cost and thermal mass.

In an alternative preferred embodiment illustrated in FIG. 7, a bridge circuit is shown having temperature responsive heated sensing elements 322 and 324 and fixed resistors 365 and 366, but also includes an inductor 374 which is coupled to a fixed DC voltage or current supply, and a capacitor 376 connected to an AC voltage or current supply with a high frequency relative to the flow modulation rate. The DC supply 372 provides the bridge with the power to sense low flow rate, the signal output appearing at terminals 368. The AC supply provides the energy to replace the heat losses due to heat removal by the fluid flow. The inductor 374 and capacitor 376 serve to isolate the sensing the heating functions. Sensing and control in this embodiment is similar to that of the circuit in FIG. 6 and the omission of the separate heaters is a significant advantage.

In a further alternative preferred embodiment illustrated in FIG. 8, the bridge circuit comprised of heated temperature responsive sensing elements 422 and 424 and fixed resistors 465 and 466 is powered by a rectangular signal pulse 474 of high frequency relative to the flow modulating rate. The signal pulse has a constant peak voltage, whereby the magnitude of the modulation of the peak output 468 from the bridge is representative of flow rate and is detected near the beginning of each pulse 474. The detection means is responsive only to the peak magnitude of the pulse 474, while its width is controlled to heat the sensors 422 and 424 to replace the heat removed by the fluid flow so that the average temperature of the elements 422 and 424 is maintained at a constant amount over that of the fluid. The control of the width of pulse 474 is accomplished with means for sensing the fluid and the average temperatures of elements 422 and 424, and controlling the width of the pulse 474 to the bridge in accordance with these temperatures.

Figure 9:
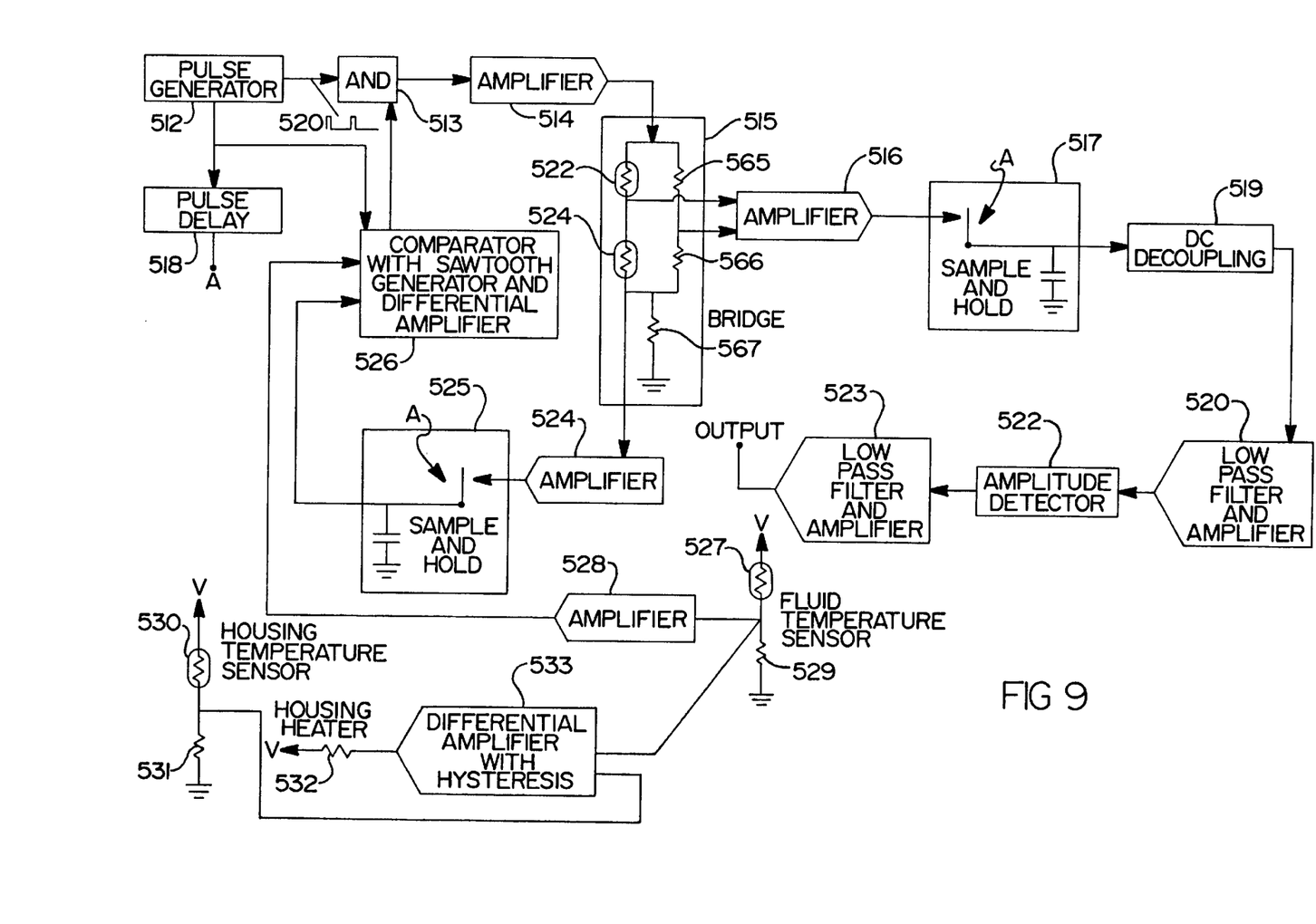
FIG. 9 is a simplified electrical block diagram of a circuit for powering the bridge circuit of FIG. 8.

FIG. 9 illustrates a preferred embodiment of the electrical block diagram employing the elements of FIG. 8. Block 512 is a pulse generator producing a narrow pulse width wave 520 at a much higher rate than the flow modulation rate. The wave 520 enters an AND-circuit 513 and proceeds to the amplifier 514 where it is increased in magnitude, the pulse then powering the bridge 515. The bridge 515 heated temperature-responsive sensing elements 522, 524 are electrically heated and, when alternately exposed to the flowing fluid, produce a correspondingly modulated portion of the bridge excitation at their common junction which enters differential amplifier 516. The other input to amplifier 516 is from the junction of the reference pair of resistors 565 and 566 which are temperature stable, the amplifier output thereby being a pulse with a magnitude proportional to the differential temperature experienced by the elements 522 and 524.

The signal from amplifier 516 enters the sample and hold circuit 517 which is triggered to sample from terminal "A" of pulse delay circuit 518, a small delay being desired to minimize noise when higher power circuits such as the bridge 515 are being energized. The output from the sample and hold circuit 517 is a DC level with an AC or modulation component corresponding to the fluid flow modulation. Alternatively, the two output signals from the bridge 515 could each have their own sample and hold circuit 517 with their DC outputs then entering the differential inputs of amplifier 516. In either case, the DC component is removed by the DC decoupling circuit 519, typically a capacitor and resistor, leaving only an AC signal which in turn is processed by low pass filter and amplifier 520, amplitude detector 522 and output low pass filter and amplifier 523.

Since a DC decoupling circuit 519 is used to remove the DC component of the bridge 515, only the AC component of the bridge 515 output, which is that corresponding to the modulation of the fluid flow, is used as a measure of flow rate. Drifts which correspond to instability of the bridge 515 components are very much reduced since the DC offsets which they produce at the bridge 515 are removed in processing the signal. In fact, the flow sensor is functional with only one of the elements 522 or 524 being responsive to temperature. It will be obvious, however, that the DC component of the bridge 515 output would then change significantly with flow rate and that the decoupling circuit 519 may not react quickly enough to remove such a changing DC component of the bridge 515 output signal. This would then appear in the flow sensor output as a short term flow measurement error. The advantage then in having both elements 522 and 524 temperature responsive the same amount and the bridge 515 fully balanced under all flow conditions is that the DC component of the bridge output signal remains relatively stable. This serves to minimize transient DC signals and corresponding measurement errors particularly when the flow rate is changing.

The resistance of elements 522 and 524 is much lower than that of resistors 565 and 566 so that most of the bridge 515 excitation current is through elements 522 and 524. Resistor 567 preferably has a low value of resistance relative to that of the elements 522 and 524 so that the magnitude of its current pulse varies with the resistance of elements 522 and 524, thereby providing voltage pulses with a magnitude responsive to their average temperature. The output signal from resistor 567 is amplified by amplifier 524 and detected by sample and hold circuit 525, the resulting DC signal entering the differential amplifier portion of block 526. The other input to the differential amplifier portion of 526 is a DC signal from amplifier 528 derived from fluid temperature sensor 527 and resistor 529. Amplifier 528 provides the offset needed to establish pulse width control about the desired differential temperature.

The output of the differential amplifier 526 is a DC signal with a magnitude representative of the difference in temperature between the fluid temperature sensor 527 and the average temperature of elements 522 and 524, plus an offset due to the circuit constants. This DC signal enters one input of a comparator 526. The other input of the comparator 526 receives an internally generated sawtooth wave reset by pulse generator 512, whereby a rectangular wave is produced with a high/low duty cycle responsive to the difference between the inlet fluid and the desired average temperature of elements 522 and 524. This rectangular wave enters the AND-circuit 513 so that the pulse width entering amplifier 514 and used to energize bridge 515 is regulated to adjust the average power dissipated by elements 522 and 524. This ensures that their average temperature is maintained the desired amount above that of the inlet fluid. The fluid temperature sensor 527 may be located on the sensor or at a remote location.

In some flow sensing applications the fluid will be at a temperature very different from that of the sensor ambient temperature and thereby cause measurement error. It may be desired to thermally isolate and insulate the flow wetted sensor components so that they are at the same temperature as that of the fluid. When very low flows or extremes of temperature are involved these components may need to be forcibly heated or cooled. For example, when the sensor is measuring the flow of steam, the steam will liberate some of its heat to raise the temperature of the sensor to that of the steam, and in the process of doing so may form water droplets and reduce its velocity inside the sensor, both actions capable of causing measurement error. If the sensor is operating on a differential pressure principle where typically the flow rate is very low, the sensing error could be quite high. This problem is solved by the signal from the fluid temperature sensor 527 and resistor 529 also being used with the signal from housing temperature sensor 530 and resistor 531 in a differential amplifier with hysteresis 533. This controls power to housing heater 538 and thereby regulates the housing temperature so that it matches that of the fluid. If the fluid were relatively cold, a thermoelectric cooling module and heat dissipator may be used for the same purpose.

Figure 10:
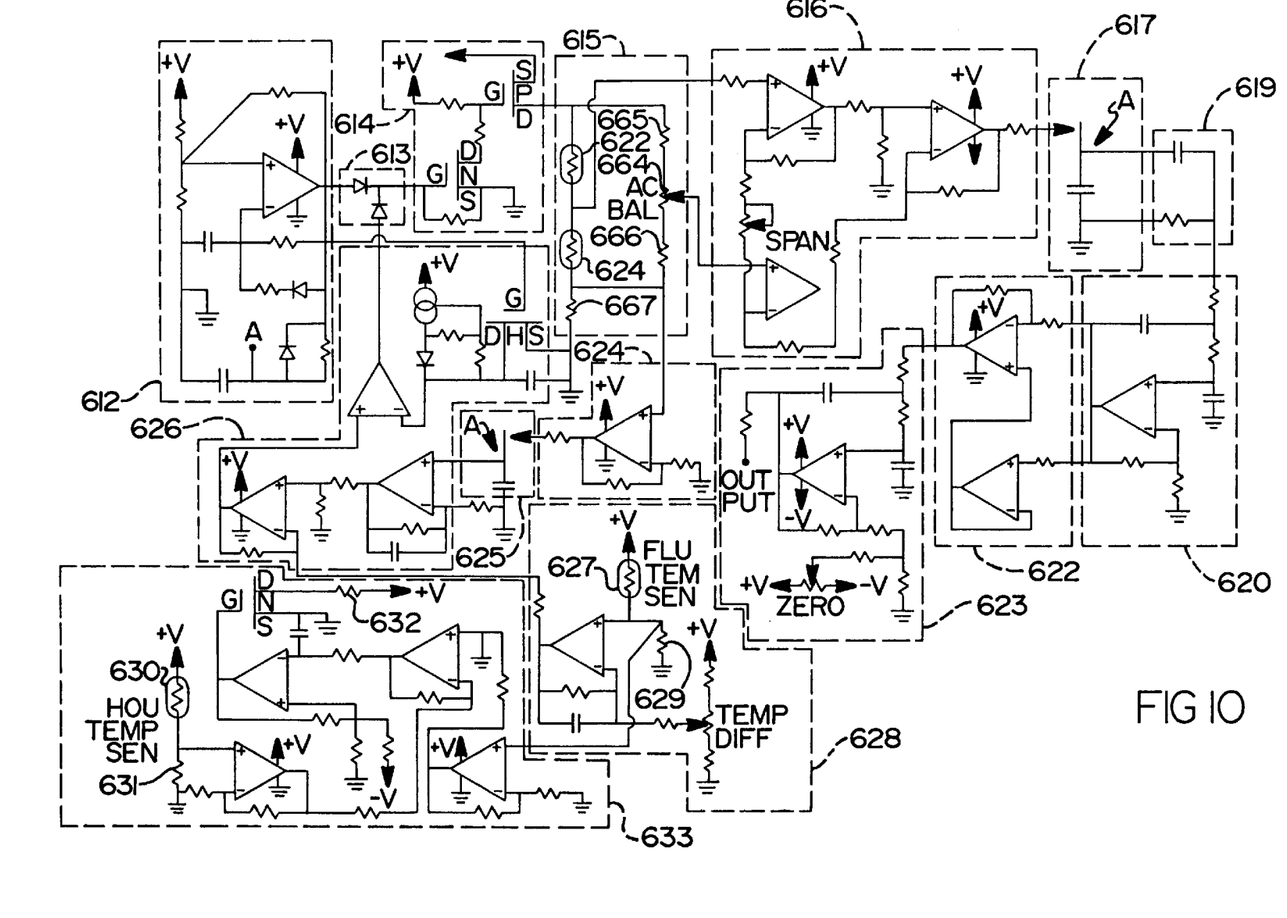
FIG. 10 is a detailed electrical schematic diagram for implementing the circuit of FIG. 9.

FIG. 10 illustrates a preferred embodiment of an electrical schematic representation of FIG. 9 whereby each electrical circuit within a dashed box is identified by a numeral increased by 100 over that of the corresponding functional block in FIG. 9. Block 612 outlines a pulse generator with a comparator as the active element and resistive capacitive timing components whereby the resistive element is altered in one direction of current flow to produce a pulse with a short duration relative to its repetition rate. The pulse enters one input of the diode AND-circuit 613 and is increased in magnitude by the amplifier 614 to excite bridge 615. The pulse also provides a sample and hold interrogation pulse at point A which is delayed slightly to minimize noise pickup as may be the case when relatively large current pulses are used to power the bridge.

The bridge 615 elements 622 and 624 are identical temperature responsive electrically heated elements each having an electrical resistance which changes with temperature. The elements 622 and 624, being alternately exposed to the fluid flow, produce an amplitude modulation of the bridge 615 excitation pulse at their common connection. This signal then enters one of the differential inputs of amplifier 616. The other side of the bridge is composed of two temperature stable electrical resistors 665 and 666 and an AC balance potentiometer 664 with its wiper connection providing the output reference signal to the other input of the amplifier 616. The potentiometer 664 is adjusted to compensate for variances in component characteristics so that the bridge 615 remains balanced and does not produce an average DC shift over the flow modulation cycle with change in the fluid flow rate, thereby minimizing transient flow measurement error.

The electrical resistance of resistors 665, 666 and potentiometer 664 is much greater than that of elements 622 and 624 so that almost all of the bridge current pulse is through and thereby controlled by elements 622 and 624. As the resistance of elements 622 and 624 is much greater than that of stable resistor 667, the voltage pulse across resistor 667 varies with the temperature of elements 622 and 624, this voltage pulse being amplified by amplifier 624, after which it enters sample and hold circuit 625. The sample and hold circuit 625 output signal, now a DC voltage, enters circuit 626 where it is further amplified and low pass filtered prior to entering one input of a differential amplifier. The other input to the differential amplifier is derived from the fluid temperature sensor 627 and resistor 629 with an offset voltage corresponding to the temperature differential desired as incorporated in circuit 628.

The output from the differential amplifier then enters one of the differential inputs of a comparator. The other input of the comparator being connected to a sawtooth wave generator which is supplied with a constant current source for good linearity and is reset by the pulse generator 612. The output of the comparator is a rectangular wave with the same periodic rate as the output of pulse generator 612 but with a duty cycle which varies with the temperature of element 622 and 624. This output enters the AND-circuit 613 to lengthen the width of the pulse into amplifier 614, thereby raising the power dissipation of elements 622 and 624 as required to maintain their temperature above that of the fluid temperature sensor 627 by the desired amount.

The output signals from the bridge 615 enter amplifier 616, which is a conventional instrumentation amplifier, and are thereby amplified. The amplified signal enters the sample hold circuit 617 where signal sampling occurs at the peak of the bridge excitation pulse after the pulse generation noises have subsided. The output signal from the sample and hold circuit 617 is a DC voltage with an AC modulation component having a magnitude corresponding to the magnitude of the modulated flow affecting the elements 622 and 624. The DC voltage is removed in the high pass filter 619 while the AC modulation component is low pass filtered to reduce noise and amplified in 620, and then amplitude detected by the dual op amp circuit 622. The detected output is further low pass filtered and amplified in circuit 623 to provide the final output signal, which is a voltage corresponding to mass flow rate.

The signal from the fluid temperature sensor 627 and resistor 629 in circuit 628 is also used in circuit 633. The signal from housing temperature sensor 630 and resistor 631 are used to produce an amplified difference signal between the two. The difference signal is used to power a heating or cooling device, as in heater 32, to maintain the housing of the flow sensor at the same temperature as that of the fluid being measured. This provision is optional, it being recognized that the thermodynamic active elements of the flow sensor may be probe mounted or located on or even inside of the conduit containing the fluid being measured. It will be further appreciated that the housing heating or cooling device as in heater 632 can be temperature responsive and eliminate the need for a separate temperature sensor by using similar techniques to those employed with elements 622 and 624.

Figures 11, 12, 13, 13A:
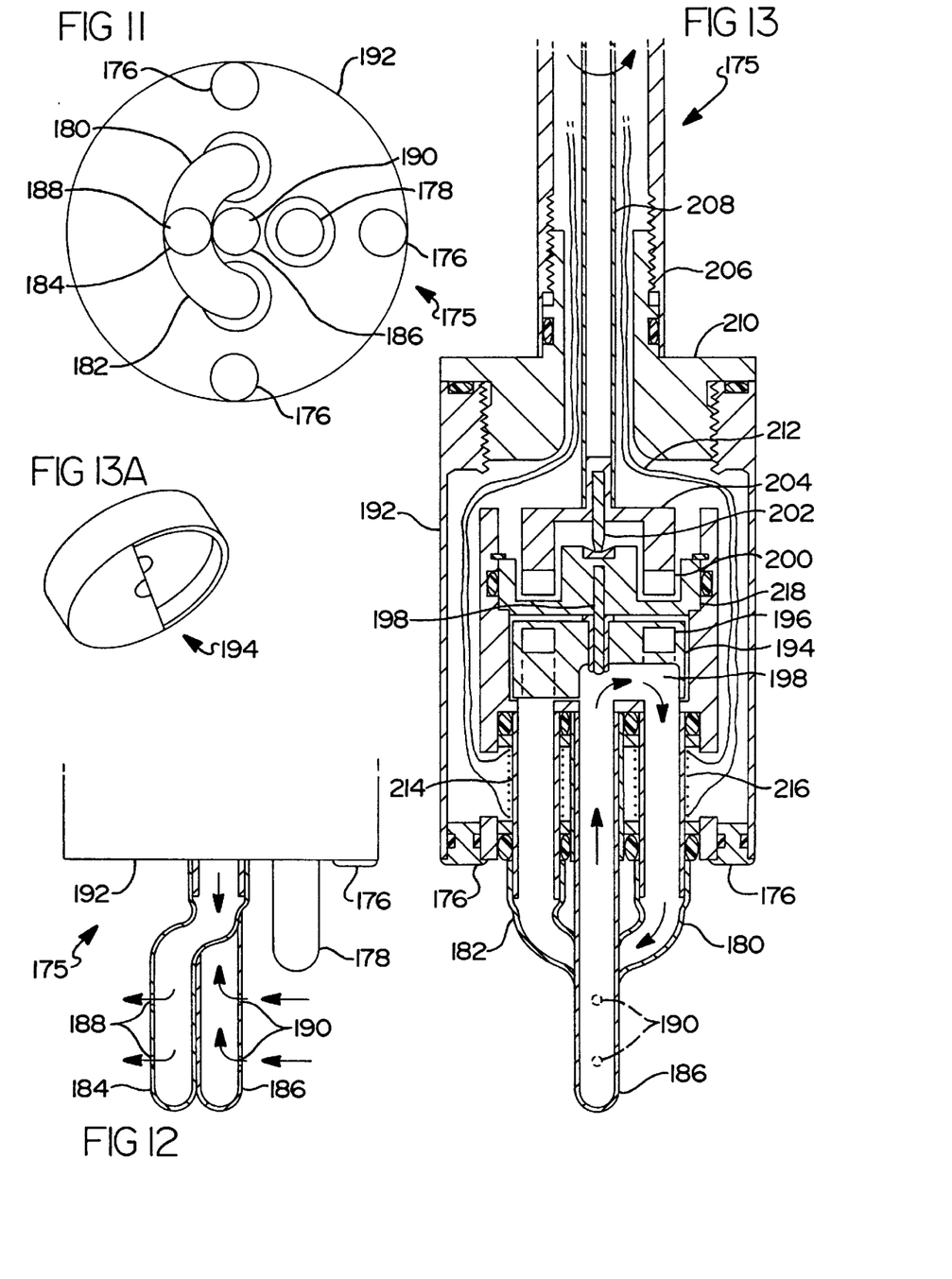
FIG. 11 is a bottom view of a sensor in accordance with another alternative preferred embodiment of the present invention.
FIG. 12 is a side, partial cross sectional view of a portion of the flow sensor of FIG. 11 in accordance with section line 12—12 in FIG. 11.
FIG. 13 is a partial cross sectional side view of the flow sensor of FIG. 11.
FIG. 13a is a perspective view of the flow modulator of the flow sensor shown in FIG. 13.

In yet another alternative preferred embodiment 175 as illustrated in FIGS. 11, 12 and 13, the mechanical configuration of the flow sensor is modified somewhat compared to that of FIG. 5 to increase its versatility and better accommodate its direct insertion into the fluid flow stream. FIG. 11 shows the bottom view of the sensor 175 where hollow cylindrical tubes 180 and 182 emerging from the sensor body 192 are branches of a "Y" connection while hollow cylindrical tube 184 is common to both. It will be noted that any other mechanical arrangement such as a tubular "T" or machined part which connects two flow passages to one flow passage irrespective of the shape of the flow passages, and interfaces with the fluid flow stream, may also be used. Tube 184 has at least one hole 188 for the fluid being measured by the sensor to exit the sensor. Hollow tube 186 is centrally located between tubes 180 and 182 and has at least one entrance hole 190 for the fluid being measured to enter tube 186 and thereby the sensor 175. Tube 178 encloses a temperature sensor which senses the temperature of the fluid flow. Plugs 176 close the holes through which the sensor's 175 internal connecting wires are routed to protect them and other internal parts of the sensor 175 from the fluid environment.

FIG. 12 shows a lower portion of the side view of the sensor 175 with a section through each of the flow sensing tubes. The fluid enters the sensor 175 through openings 190 in tube 186 and is routed to the interior of the sensor 175. The fluid exits the sensor 175 through openings 188 in tube 184. FIG. 12 is simplified to indicate fluid flow and direction within each tube type (inlet or exit) by each tube in cross section. However, the emerging parts of the "Y" branch tubes 180 and 184 from the sensor body 192 do not actually lie in the same plane as tube 188. Tubes 188 and 186 are typically attached to each other by welding for structural support and so that tube 186, for example, need only be firmly secured to the sensor body 192. As shown, tube 186 then is mechanically anchored in body 192 and thereby also retains the tubular "Y" composed of tubes 180, 182 and 188 in their normal position as shown.

FIG. 13 shows in side view cross section the principal elements of the sensor 175 of FIG. 12 rotated 90 degrees. Tube 186 shows the location (dotted) of the holes through which the fluid being measured enters the sensor 175. The fluid is directed upwards to a flow modulator 194 which acts as a valve to route the fluid flow along its flow path 198 on the right side leading to heated temperature responsive sensing element 216, then through tube 180, and finally exiting the sensor 175 through openings 188 of tube 184 as in FIG. 12. The flow modulator 194 is shown in greater detail in FIG. 13a.

When the flow modulator 194 is rotated 180 degrees, the fluid flow is then routed to the left leading to heated temperature responsive sensing element 214 and then through tube 182 and finally exiting the sensor 175 through openings 188 of tube 184 as in FIG. 12. The modulator 194 rotates on bearing 198 and contains magnets 196 which are magnetically attracted to and thereby moved from across the fluid barrier 218 by magnets 200. This enables rotational torque supplied by a motor (not shown) connected to shaft 208, which is coupled to magnet support 204, to rotate the modulator 194. Bearing 202 supports the driven magnet assembly and, in particular, the thrust loading between the driven and slaved magnets. The housing is closed with an o-ring sealed fitting 210 and connected to stem 206 for mechanical attachment, typically to a wall of a fluid containing pipe with a compression fitting which allows movement for insertion depth control.

The electrical connecting wires to the sensors 212 and to the temperature sensor 178 in FIG. 12 are routed through the housing 192 holes which are closed to the fluid with plugs 176. The elements 214 and 216 are typically centered with o-rings which seal against fluid leaks and have backing washers to support the fluid pressure loads.

Elements 214 and 216 are electrically heated and thermally insulated so that their temperatures are responsive to the heat removed by the fluid flow. As the modulator 194 rotates, fluid flow alternates between elements 214 and 216 as in FIG. 5 with similar results. The electrical connections as related to FIGS. 9 and 10 are also similar with the exception that it is usually unnecessary to regulate the temperature of the housing 192 when it is surrounded by the fluid flow, as the housing 192 would thereby automatically be at the correct temperature. An integral fluid temperature sensor 178 as in FIG. 12 is conveniently located and does not interfere with the fluid flow pattern of the flow sensor. The integration of all of the provisions for mass flow sensing and correcting for high accuracy in a relatively small physical package as represented by this embodiment is a significant advantage.

Another advantage of the sensor of FIGS. 11, 12 and 13 is that the tubes 184 and 186 which are used directly for sensing fluid flow may have many sensing holes, as in pitot tubes. The sensing holes may be regularly or irregularly spaced or even of different sizes to accommodate flow profile variations and enable accurate flow measurements to be made over a wide range of flow conditions. Furthermore, flow sensing of fluid flow over the entire cross section of large pipes may thereby be made with little additional cost over that of small pipes.

The fundamental sensor design is very flexible. For example, tubes 184 and 186 may also be quite short and terminated with fittings which can attach to pipe mounted pitot tubes or pressure differential and sampling type sensing probes of various types. In a further example, tubes 180, 182 and 184 may be omitted entirely, whereby the fluid exits through sensors 214 and 216 into the fluid flow, preferably through a dead space. The fluid temperature sensor 178 may be located remotely to sense the temperature of the fluid entering the sensor. The temperature of the sensor housing may also be controlled to further minimize mass flow sensing error.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A flow sensor for measuring a rate of flow of a fluid flowing through a conduit defining a flow path, said flow sensor comprising:
   a first temperature sensitive sensing element disposed in said fluid flow path and in contact with said fluid, said first sensing element being heated;
   a flow modulator assembly for periodically varying said fluid rate of flow in contact with said sensing element alternately from a maximum to a minimum level to thereby cause said sensing element to generate a cyclic signal indicative of the heat removed from said sensing element by said fluid flow;
   a detection system responsive only to a magnitude of said cyclic signal for extrapolating therefrom a mass flow rate of said fluid flow;
   a second temperature sensitive sensing element for generating a second cyclic signal indicative of the heat removed from said second sensing element by said fluid flow;
   said flow modulator assembly having a flow modulator member having a first opening forming a first flow passageway and a second opening forming a second passageway disposed generally orthogonally to said first flow passageway; and
   a motor for rotating said flow modulator member.

2. A flow sensor according to claim 1, wherein said flow modulator assembly includes first and second openings in communication with first and second flow passageways to permit portions of said first and second sensing elements to be placed therein so as to be in the flow path of said fluid when its associated said passageway is positioned parallel to said flow path.

3. A flow sensor for measuring a rate of flow of a fluid flowing within a flow path, comprising:
   a pair of heated, electrically-responsive, temperature-sensitive sensing elements, each providing an electrical signal in response to temperature changes thereto produced by the removal of heat therefrom by said fluid contacting said temperature-sensitive elements as said fluid flows past said temperature-sensitive elements;
   a flow modulator for dividing said flow path into first and second flow channels and for controlling said fluid flow through said channels such that when said fluid flow through said first channel is at a maximum said fluid flow through said second channel is at a minimum, and when said fluid flow through said second channel is at a maximum said fluid flow through said first channel is at a minimum, to thereby enable said temperature-sensitive sensing elements to produce a pair of cyclic electrical signals each having a magnitude representative of the degree of removal of heat from each of said temperature-sensitive sensing elements;
   a system for detecting said cyclic electrical signals and determining therefrom a heat removal rate caused by said fluid flow, and from said heat removal rate determining a mass flow rate of the fluid flowing within the flow path and
   a motor for rotating said flow modulator.

4. A flow sensor according to claim 3, further comprising a plurality of magnets for coupling said motor to said flow modulator.

5. A flow sensor according to claim 3, wherein said flow modulator comprises a member having an opening forming a first flow passageway and a second opening forming a second flow passageway arranged approximately orthogonally to said first flow passageway.

6. A flow sensor according to claim 3, further comprising a bypass conduit in communication with said flow path, said temperature-sensitive sensing elements being disposed in said bypass conduit so as to be subjected to a portion of said fluid flow.

7. A flow sensor according to claim 6 further comprising a member disposed in said flow path so as to obstruct the flow of said fluid through said flow path, thereby creating a pressure differential between an inlet side and an outlet side of said bypass conduit.

8. A flow sensor according to claim 7, wherein a single fitting couples together the said bypass conduit and said flow obstruction member, with the flow path.

9. A flow sensor according to claim 7, wherein the said flow obstructing member contains an element for controllably obstructing said fluid flow through said flow path.

10. A flow sensor for measuring a mass flow rate of a fluid, said flow sensor comprising:
    at least one temperature sensitive sensing element disposed in a path of said fluid flow, said sensing element being heated;
    an assembly for periodically varying a flow rate of said fluid flow over said sensing element alternately from a maximum level to a minimum level to thereby cause said sensing element to generate a cyclic signal indicative of the heat removed from said sensing element by said fluid flow;

a system for detecting a magnitude of said cyclic signal and for extrapolating therefrom a mass flow rate of said fluid flow, said magnitude of said cyclic signal being unaffected by a frequency thereof; and a temperature control system for detecting a temperature difference between said fluid and said sensing element and controlling heating of said sensing element to maintain a predetermined average value of said temperature difference to replace the heat removed from said sensing element by said fluid flow.

11. The flow sensor as in claim 10, wherein two temperature sensitive elements are disposed to alternately be exposed in said path of said fluid flow, each said sensing element generating a cyclic signal and being heated.

12. The flow sensor of claim 11, wherein said cyclic signals are combined to produce a signal representative of said flow rate of said fluid.

13. The flow sensor of claim 10, wherein said system for detecting said cyclic signal and for extrapolating therefrom a mass flow rate further operates to maintain a predetermined average temperature difference between said fluid flow and said sensing element at a constant, predetermined value regardless of changes in the temperature of said sensing element.

14. The flow sensor of claim 10, further comprising a pitot tube through which said fluid flow flows.

15. The flow sensor of claim 10, wherein said fluid flow through said assembly is caused by a pressure differential experienced by said fluid flow.

16. A flow sensor for measuring the mass flow rate of a fluid flowing through a flow path, said flow sensor comprising:

at least one temperature sensitive sensing element disposed in said flow path, said sensing element being heated;

an assembly for periodically controlling a rate of flow of said fluid flow over said sensing element alternately from a maximum level to a minimum level to thereby cause said sensing element to generate a cyclic signal indicative of the heat removed from said sensing element as a result of contact with said fluid flow;

a detection system responsive only to a magnitude of said cyclic signal for extrapolating a flow rate of said fluid flow;

a detection system responsive to said flow rate signal for controlling heating of said sensing element to replace, at least in part, heat removed from said sensing element by said fluid flow; and wherein said detection system operates to maintain a predetermined average difference in temperature between said fluid and said sensing element at a constant, predetermined value regardless of changes in the temperature of said sensing element.

17. The flow sensor as in claim 16, wherein at least a flow detecting portion of said sensing element is inserted in the fluid flow so that said flow detecting portion acquires the temperature of said fluid so that the physical properties of said fluid are not altered as said fluid passes through said sensor to thereby prevent mass flow sensing error.

18. The flow sensor as in claim 16, wherein said flowpath is comprised of a pitot tube.

19. The flow sensor as in claim 16, wherein said fluid flow through said assembly is caused by a pressure differential experienced by said fluid flow.

* * * * *